(12) United States Patent
Yu et al.

(10) Patent No.: US 12,050,898 B2
(45) Date of Patent: Jul. 30, 2024

(54) ONLINE PROGRAM UPDATE METHOD FOR OPTICAL AMPLIFIER, AND DEVICE

(71) Applicant: Accelink Technologies Co., Ltd., Wuhan (CN)

(72) Inventors: Long Yu, Wuhan (CN); Xuan Luo, Wuhan (CN)

(73) Assignee: Accelink Technologies Co., Ltd., Wuhan (CN)

( * ) Notice: Subject to any disclaimer, the term of this patent is extended or adjusted under 35 U.S.C. 154(b) by 403 days.

(21) Appl. No.: 17/419,536

(22) PCT Filed: Dec. 13, 2019

(86) PCT No.: PCT/CN2019/125254
§ 371 (c)(1),
(2) Date: Jun. 29, 2021

(87) PCT Pub. No.: WO2020/140734
PCT Pub. Date: Jul. 9, 2020

(65) Prior Publication Data
US 2022/0113955 A1 Apr. 14, 2022

(30) Foreign Application Priority Data
Jan. 2, 2019 (CN) .......................... 201910002166.X

(51) Int. Cl.
*G06F 8/65* (2018.01)
*H01S 3/067* (2006.01)
*H01S 3/10* (2006.01)

(52) U.S. Cl.
CPC ............ *G06F 8/65* (2013.01); *H01S 3/06754* (2013.01); *H01S 3/10015* (2013.01)

(58) Field of Classification Search
CPC ......... G06F 8/60–66; H04B 10/29–299; H01S 3/06754–06787; H01S 3/10–1003
See application file for complete search history.

(56) References Cited

U.S. PATENT DOCUMENTS

| 5,313,386 A | 5/1994 | Cook et al. |
| 5,958,750 A | 9/1999 | Au-Young et al. |

(Continued)

FOREIGN PATENT DOCUMENTS

| CN | 1916854 A | 2/2007 |
| CN | 101814957 A | 8/2010 |

(Continued)

OTHER PUBLICATIONS

International Search Report from PCT/CN2019/125254 mailed Mar. 6, 2020; 2 pages.

(Continued)

*Primary Examiner* — Todd Aguilera
(74) *Attorney, Agent, or Firm* — Lei Fang, Esq.; Smith Tempel Blaha LLC

(57) ABSTRACT

Disclosed are an online program update method and device for an optical amplifier. The method comprises: when a program update instruction is sent, a Microcontroller Unit MCU receiving update programs of MCU and a programmable logic device FPGA, storing them in a program memory device, and sending an update instruction to FPGA; FPGA terminating; operations of a digital-to-analog converter DAC according to the instruction and a current state remaining unchanged; MCU loading new codes of MCU and FPGA while DAC remains in state of halting refreshing; and after MCU and FPGA run the new codes, reading previously stored data, and starting switching from a previous operation state to enter normal operation state. On basis of conventional optical amplifier control, the invention combines characteristics of MCU and FPGA, and ensures uninterrupted service of optical amplifiers, achieving smooth transition of services, thereby improving stability and reliability of whole optical communications systems.

9 Claims, 5 Drawing Sheets

(56) References Cited

U.S. PATENT DOCUMENTS

| | | | |
|---|---|---|---|
| 7,171,606 B2* | 1/2007 | Blackburn | H04L 9/40 |
| | | | 714/763 |
| 9,078,054 B2* | 7/2015 | Ooki | H04Q 11/0005 |
| 2004/0193998 A1* | 9/2004 | Blackburn | H04L 9/40 |
| | | | 714/763 |
| 2008/0205460 A1 | 8/2008 | Okaniwa et al. | |
| 2014/0105601 A1* | 4/2014 | Ooki | H04Q 11/0005 |
| | | | 398/48 |
| 2014/0146386 A1 | 5/2014 | Nakata | |

FOREIGN PATENT DOCUMENTS

| | | |
|---|---|---|
| CN | 105893090 A | 8/2016 |
| CN | 105912356 A | 8/2016 |
| CN | 106610847 A | 5/2017 |
| CN | 107436778 A | 12/2017 |
| CN | 107968682 A | 4/2018 |
| CN | 108376077 A | 8/2018 |
| CN | 109687278 A | 4/2019 |

OTHER PUBLICATIONS

First Search Report for Chinese Application No. 20191000216X issued Jun. 28, 2020; 2 pages.

Second Search Report for Chinese Application No. 201910002166X issued Mar. 15, 2021; 2 pages.

* cited by examiner

ONLINE PROGRAM UPDATE METHOD FOR OPTICAL AMPLIFIER, AND DEVICE

CROSS-REFERENCE TO RELATED APPLICATIONS

The present application is a national phase entry under 35 U.S.C § 371 of International Application No. PCT/CN2019/125254 filed Dec. 13, 2019, which claims priority from Chinese Application No. 201910002166.X filed Jan. 2, 2019, all of which are hereby incorporated herein by reference.

TECHNICAL FIELD OF THE DISCLOSURE

The present disclosure relates to the field of optical communication technology, and in particularly, to an online program update method and device for an optical amplifier.

BACKGROUND

The optical amplifier is one of key modules in an optical communication network. It mainly functions in an optical fiber communication line to achieve optical signal amplification, and its performance directly determines the quality of optical communication service in a transmission network. When the optical amplifier is applied to a backbone network, due to actual engineering requirements or design problems, it is usually necessary to upgrade a program and run a new program. At this time, it is necessary that the optical communication service cannot be interrupted, that is, when the input light and other external environmental variables are not changed, the optical amplifier can be updated smoothly, and after the program is updated, the optical amplifier continues to maintain an original working state, and at the same time, it continues to output optical signals, so as to achieve a smooth switch for the optical amplifier.

At present, a control program of the optical amplifier mainly runs on a microcontroller Unit (MCU) and a Field-Programmable Gate Array (FPGA). When the optical amplifier program operating in the transmission network is upgraded, the existing optical fiber communication service is often interrupted, and the optical communication service cannot be guaranteed to continuously operate, thereby affecting the stability and reliability of the entire optical communication system.

In view of this, it is an urgent issue to be solved in this technical field to overcome the above-mentioned defects in the prior art.

SUMMARY

The technical problem to be solved by the present disclosure is:

When the optical amplifier program operating in the transmission network is upgraded, the existing optical fiber communication service is often interrupted, and the optical communication service cannot be guaranteed to continuously operate, thereby affecting the stability and reliability of the entire optical communication system.

The present disclosure achieves the above objective through the following technical solutions:

In the first aspect, the present disclosure provides an online program update method for an optical amplifier, comprising:

when a Microcontroller Unit MCU receives an upgrade instruction and an upgrade code, saving the upgrading code and sending the upgrading instruction to a programmable logic device;

after the programmable logic device receives the upgrading instruction, stopping operation of a digital-to-analog converter and sending a response back to the MCU, so that the MCU saves a current working state and parameters;

after the MCU is restarted, loading the last saved upgrade code and sending the last saved working state and parameters to the programmable logic device;

switching a working state of the digital-to-analog converter by the programmable logic device according to the received working state and parameters, so that an initial state of current operation is the same as the working state before the upgrade code is loaded.

Preferably, after the MCU restarts and loads the last saved upgrade code, the method further comprises:

determining whether a current loading mode is power-on loading or continuous light loading;

if the current loading mode is the power-on loading, sending a default working state and parameters to the programmable logic device by the MCU, so that the programmable logic device controls the digital-to-analog converter to switch from a non-light state to the default working state;

if the current loading mode is the continuous light loading, sending the last saved working state and parameters to the programmable logic device by the MCU, so that the programmable logic device controls the digital-to-analog converter to switch to the last working state.

Preferably, the MCU determines the loading mode through a static random access memory, specifically:

saving, by the static random access memory, data dynamically updated when the MCU is running, and reading the data in a preset address space of the static random access memory and analyzing regularity of the data by the MCU after the MCU loads the last saved upgrade code;

if the read data is a random number, determining the current loading mode as the power-on loading; if the read data has preset regularity, determining the current loading mode as the continuous light loading.

Preferably, the upgrade code received by the MCU is divided into multiple frames, each of which contains a check bit, and programs of the MCU and of the programmable logic device contain a cyclic redundancy check (CRC) of a total package; then after receiving the upgrade code, the MCU checks the upgrade code, and sends the upgrading instruction to the programmable logic device if every frame of the upgrade code is correct by check and the CRC of each package is correct by check.

Preferably, the upgrade code is stored in a program memory, an address space of which comprises a BOOTLOADER partition, a program selection partition, a first partition, a second partition, and a gold partition, wherein the MCU starts to run the program from the BOOTLOADER partition, the first partition and the second partition alternately save the latest upgrading code, the program selection partition is updated according to the partition currently storing the upgrade code, and the gold partition is a default partition of the optical amplifier, which is used when the upgrade fails.

Preferably, the digital-to-analog converter has a serial interface, comprising a chip select, a clock interface, and one data line; or the digital-to-analog converter has a parallel interface, comprising a chip select, a clock interface, and multiple data lines; wherein magnitude of an analog voltage of the digital-to-analog converter is controlled by controlling the corresponding chip select and clock interface, so as to realize the control of the digital-to-analog converter.

In the second aspect, the present disclosure also provides an online program update device for an optical amplifier, which is used to complete the online program update method for an optical amplifier described in the first aspect. The online program update device comprises a microcontroller unit MCU 1, a programmable logic device 2, a program memory 3 and a digital-to-analog converter 4, wherein the MCU 1 is respectively communicatively connected to the programmable logic device 2 and the program memory 3, and the programmable logic device 2 and the digital-to-analog converter 4 are communicatively connected with each other;

Wherein the MCU 1 is used to receive an upgrade instruction and an upgrade code, and interacts with the program memory 3; the program memory 3 is used to store the upgrade code and a working state and parameters of the optical amplifier; the programmable logic device 2 is used to control the digital-to-analog converter 4 according to the upgrade instruction, the working state and parameters; and the digital-to-analog converter 4 is used to convert a control digital signal output by the programmable logic device 2 into an analog voltage.

Preferably, the online program update device further comprises a static random access memory 5, which is communicatively connected with the MCU 1 and is used to store data dynamically updated when the MCU 1 is running, so that the MCU 1 determines a loading mode; wherein the loading mode is divided into power-on loading and continuous light loading.

Preferably, the online program update device further comprises a pump laser control system 6 and/or a tunable optical attenuator control system 7. The pump laser control system 6 is connected to the digital-to-analog converter 4 and is used to adjust a current of a pump laser according to the analog voltage output by the digital-to-analog converter 4, and then adjusts magnitude of output light;

The tunable optical attenuator control system 7 is connected to the digital-to-analog converter 4 and is used to adjust an attenuation value of a tunable optical attenuator according to the analog voltage output by the digital-to-analog converter 4.

Preferably, the online program update device further comprises a passive optical system 8, which is connected to the pump laser control system 6, and is used to couple pump light of the pump laser and input light to a gain medium to achieve amplification of the input light.

Compared with the prior art, the beneficial effects of the present disclosure are:

Based on the conventional optical amplifier control, the present disclosure combines the characteristics of the MCU and the programmable logic device themselves, and utilizes the programmable logic device and digital-to-analog conversion characteristics to perform special control during the upgrade. When the optical amplifier program needs to be upgraded, the FPGA can stop the work of the digital-to-analog converter, and the MCU saves the current working state and parameters. When a new program is loaded, the FPGA can switch from the last saved working state and enter the normal working state to complete the smooth transition of the service so as to ensure the service of the optical amplifier is not interrupted, thereby improving the stability and reliability of the entire optical communication system.

BRIEF DESCRIPTION OF THE DRAWINGS

In order to explain the technical solutions of the embodiments of the present disclosure more clearly, the following drawings that need to be used in the embodiments of the present disclosure will be briefly introduced. Obviously, the drawings described below are only some embodiments of the present disclosure. For those of ordinary skill in the art, other drawings can be obtained based on these drawings without creative work.

DETAILED DESCRIPTION

In order to make the objectives, technical solutions, and advantages of the present disclosure clearer, the present disclosure will be further described in detail with reference to the accompanying drawings and embodiments. It should be understood that embodiments described here are only used to explain the present disclosure, but not to limit the present disclosure.

In each embodiment of the present disclosure, the symbol "/" means that it has two functions at the same time, while the symbol "A and/or B" means that the objects connected by the symbol comprises three situations, that is, "A", "B", "A and B".

In addition, the technical features involved in the various embodiments of the present disclosure described below can be combined with each other if they do not conflict with each other. Hereinafter, the present disclosure will be described in detail with reference to the accompanying drawings and embodiments.

Embodiment 1

Figure 1:
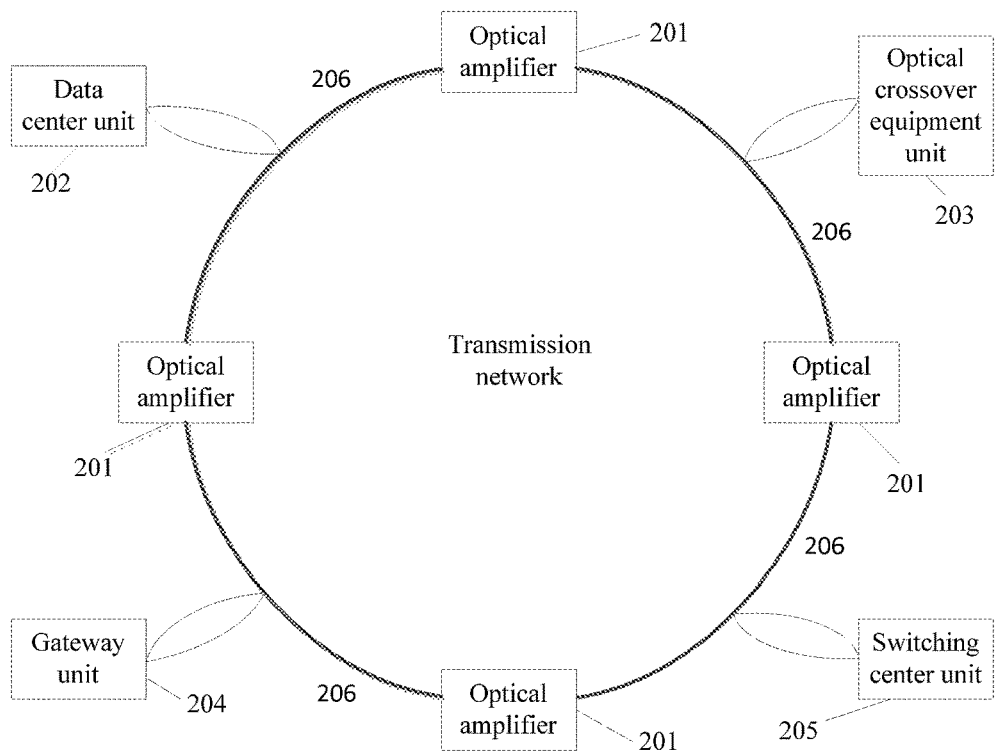
FIG. 1 is a schematic diagram of a transmission network system provided by an embodiment of the present disclosure.

A typical transmission network system is simplified as shown in FIG. 1, and comprises an optical amplifier 201, a data center unit 202, an optical crossover equipment unit 203, a gateway unit 204, a switching center unit 205 and an optical fiber connection line 206. In order to increase the transmission distance and improve the signal-to-noise ratio, a plurality of optical amplifiers 201 are placed in the optical fiber connection line 206. The performance of the optical amplifier directly determines the quality of the optical communication service in the transmission network. Therefore, when the optical amplifier program is upgraded, it is a necessary requirement not to interrupt the optical communication service.

Figure 2:
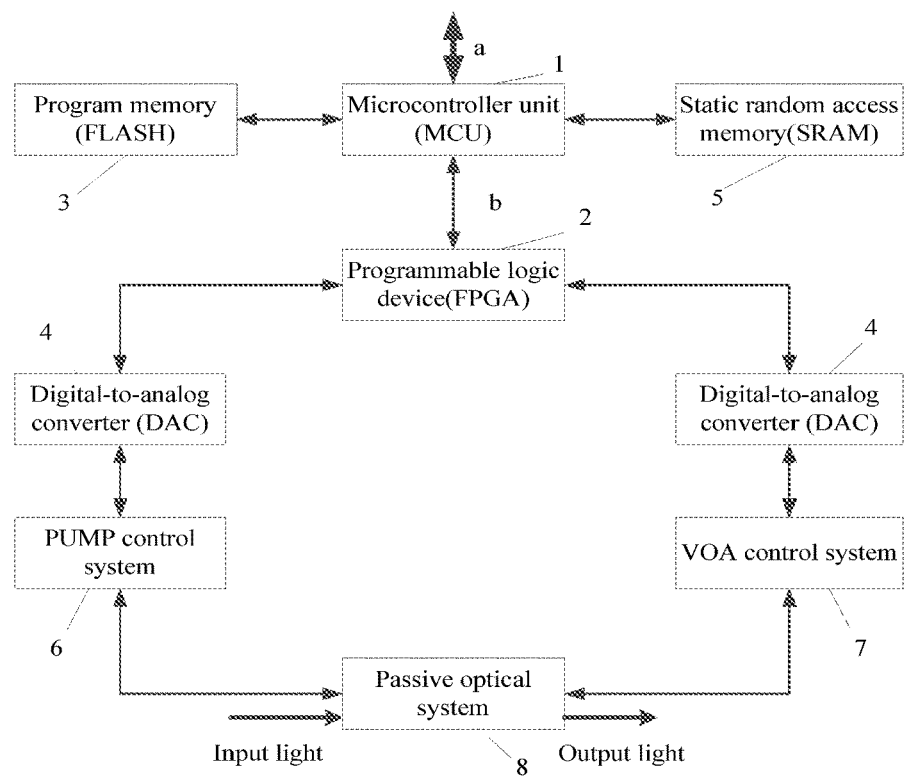
FIG. 2 is a diagram of an online program update device for an optical amplifier provided by an embodiment of the present disclosure.
Figure 3:
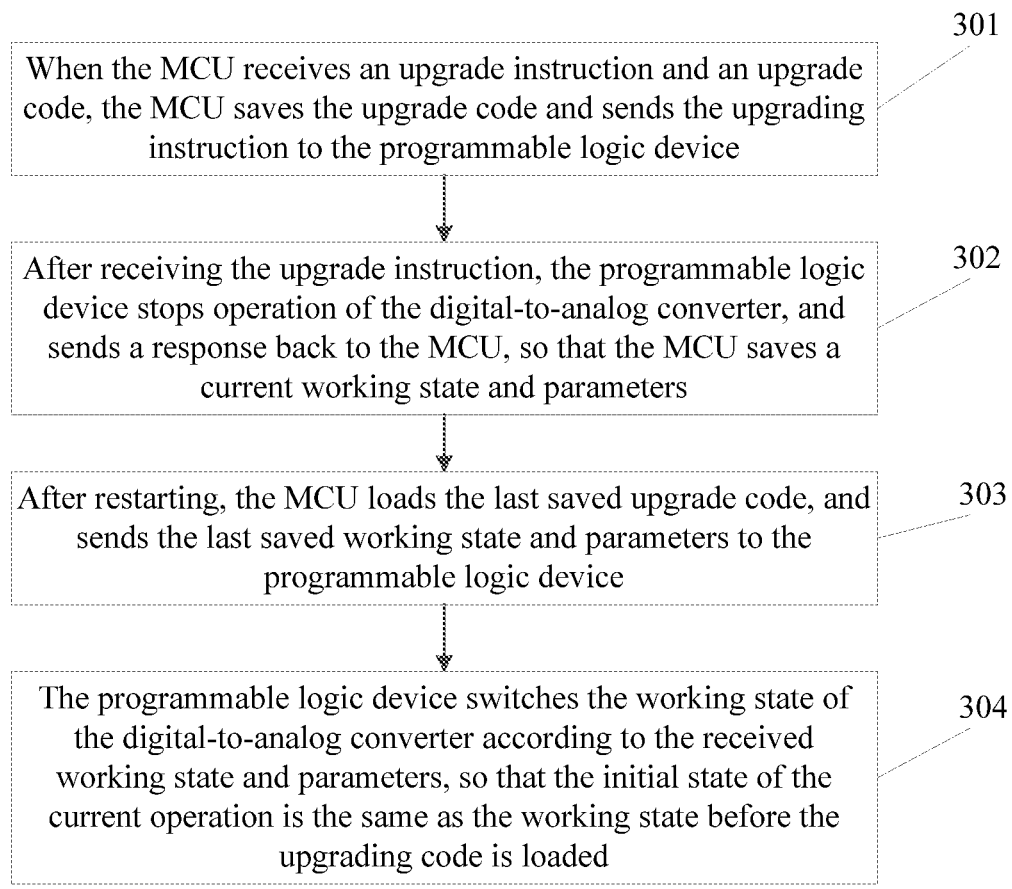
FIG. 3 is a flowchart of an online program update method for an optical amplifier according to an embodiment of the present disclosure.

In order to solve the above-mentioned problem, an embodiment of the present disclosure provides an online program update method for an optical amplifier, and a device shown in FIG. 2 is used. The device comprises a microcontroller unit (MCU) 1, a programmable logic device (FPGA) 2, a program memory (FLASH) 3, a digital-to-analog converter (DAC) 4 and a static random access memory (SRAM) 5. The MCU 1 communicates with a computer or a network management system by means of an interface a, and communicates with the programmable logic device 2 by means of an on-board bus interface b. The programmable logic device 2 is communicatively connected with the digital-to-analog converter 4. Regarding the above device, referring to FIG. 3, the method specifically comprises the following steps:

Step 301: when the MCU receives an upgrade instruction and an upgrade code, the MCU saves the upgrade code and sends the upgrading instruction to the programmable logic device.

After being powered on, the optical amplifier enters a normal working state. In the normal working process, the MCU 1 communicates with a computer or a network management system by means of the communication interface a, and then continuously receives data and instructions; and after receiving the upgrade instruction, the MCU 1 receives the upgrading code and programs the upgrade code to the program memory 3, and sends an upgrade instruction to the programmable logic device 2 by means of the on-board bus interface b. The upgrade code comprises an MCU program upgrade code and a FPGA program upgrade code so as to complete the program upgrade of both the MCU 1 and the programmable logic device 2 together.

Step 302: after receiving the upgrade instruction, the programmable logic device stops operation of the digital-to-analog converter, and sends a response back to the MCU, so that the MCU saves a current working state and parameters.

The programmable logic device 2 receives the instructions and parameters from the MCU 1 through the on-board bus interface b, and then controls the digital-to-analog converter 4 to ensure the normal operation and working of the optical amplifier. When the programmable logic device 2 receives the upgrade instruction transmitted by the MCU 1, on the one hand, the working state and parameters of the optical amplifier are kept unchanged, and the operation of the digital-to-analog converter 4 is stopped to enable the digital to analog converter 4 to keep the current state unchanged, that is, the voltage of an analog signal does not change, so that the optical amplifier enters a unbroken (or continuous) light holding state; on the other hand, the current working state and parameters of the optical amplifier are transmitted to the MCU 1, and a response is sent back, to cause the MCU 1 to save the current working state and parameters into the program memory 3.

Step 303: after restarting, the MCU loads the last saved upgrade code, and sends the last saved working state and parameters to the programmable logic device.

The MCU 1 restarts, and runs a new program from address 0 of the program memory 3, that is, the MCU 1 loads the latest upgrade code stored in the program memory 3. During the loading process, the digital-to-analog converter 4 is always in the state of stopping updating, and the optical communication service has not been interrupted. After running the new code, the MCU 1 reads the last saved working state and parameters from the program memory 3, and sends the last saved working state and parameters to the programmable logic device 2

Step 304: the programmable logic device switches the working state of the digital-to-analog converter according to the received working state and parameters, so that the initial state of the current operation is the same as the working state before the upgrading code is loaded.

After receiving the last saved working state and parameters transmitted by the MCU 1, the programmable logic device 2 switches from the last working state and enters the normal working state, that is, the digital signal of the digital-to-analog converter 4 is set as the last saved data, so that the initial state of this operation is the same as the last saved working state, and then switch from the last saved working state to the normal working state to complete the smooth transition of the service.

Based on the conventional optical amplifier control, the present disclosure combines the characteristics of the MCU and the programmable logic device themselves. When the optical amplifier program needs to be upgraded, the FPGA can stop the work of the digital-to-analog converter, and the MCU saves the current working state and parameters. After loading the upgrade code, the FPGA can switch according to the last saved working state and parameters, so that the initial state of this operation is the same as the previous working state, ensuring that the service of the optical amplifier is not interrupted, completing the smooth transition of the service, and then improving the stability and reliability of the entire optical communication system.

In the step 303, after the MCU 1 restarts and loads the last saved upgrade code, the loading mode can also be determined by means of the static random access memory 5 in advance, that is, determining the present loading mode is power-on loading or continuous light-loading. If the loading mode is the power-on loading and the optical amplifier is in a non-light state, there is no need to consider whether to interrupt the service, and the system executes from zero. Specifically, the MCU 1 sends a default working state and parameters to the programmable logic device 2, so that the programmable logic device 2 controls the digital-to-analog converter 4 to switch from the non-optical state to the default working state, enabling the optical amplifier to enter the normal operation. If the loading mode is the continuous light loading, the MCU sends the last saved working state and parameters to the programmable logic device, so that the programmable logic device controls the digital-to-analog converter to firstly switch to the last working state and then enter the normal working state, that is, execute the step 304. The default working state is an acquiescence working state, which can be preset and stored in the program memory 3 according to actual needs. The loading mode is determined as follows:

In the step 302, after saving the current working state and parameters into the program memory 3, the MCU 1 writes data into a preset address space of the static random access memory 5, so that the static random access memory 5 stores data dynamically updated when the MCU is running. In the step 303, after loading the last saved upgrading code, the MCU reads the data in the preset address space of the static random access memory 5, and applies the characteristics of the SRAM itself and an algorithm to analyze the regularity of the data, thereby determining the loading mode; if the read data is a random number, it is determined that the current loading mode is the power-on loading; if the read data has preset regularity, it is determined that the current loading mode is the continuous light loading. This is because the internal data of the static random access memory 5 is completely lost after the power is turned off, so the internal data is random numbers after the power is turned on again. When the MCU 1 reads the data in the preset address space for the first time, the data is randomly distributed; afterwards, the MCU 1 writes in regular data. When the MCU 1 reloads and runs, the read data is regular data. At this time, the loading mode can be determined as the continuous light loading. The preset address space is not uniquely limited. It is sufficient if it could be ensured that this space is not used by other system applications. Assuming that the preset address space in the SRAM is between 1000 and 1100, if 1 is written into address 1000, 2 is written into address 1001, and so on, there is regularity that where address space plus 1, data will plus 1. Or if the data in the first 50 address spaces is 0x55, and the last 50 spaces are 0xaa, etc., there is also certain regularity. then the loading mode can be determined as the continuous light loading.

In combination with the embodiment of the present disclosure, there is also provided a preferred implementation. The upgrade code received by the MCU 1 through the communication interface a is divided into multiple frames, and each frame contains a check bit, which can improve the reliability for transmitting each frame and is better to be adapted to the transmission of multiple communication protocols. At the same time, the programs of the MCU 1 and the programmable logic device 2 include the CRC of the total package, and the integrity of the data packet can be ensured by check. Specifically, after receiving the upgrade code, the MCU 1 performs checks, comprising checks on each frame of the upgrade code and CRC on the data packet; when each frame of the upgrade code is correct by check and the CRC of each package is correct, the MCU 1 sends an upgrade instruction to the programmable logic device 2 again; when the upgrade code has a check error, the MCU 1 continues to receive new instructions and data through the communication interface a until the check is successful.

Figure 4:
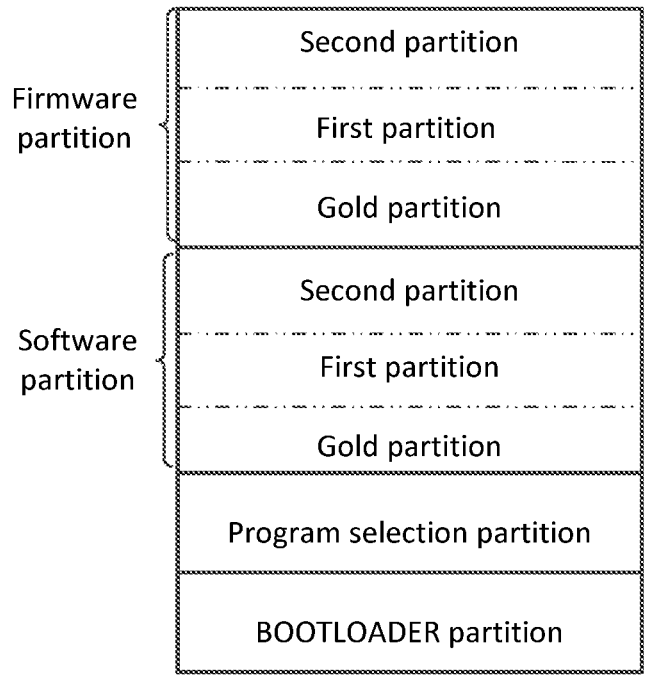
FIG. 4 is a schematic diagram of the division of the FLASH address space provided by an embodiment of the present disclosure.

In combination with the embodiment of the present disclosure, there is also a preferred implementation, which reduces the risk of upgrade failure by reasonably dividing the address space of the program memory 3. As shown in FIG. 4, the address space of the program memory 3 is firstly divided into a BOOTLOADE partition, a program selection partition, and a software partition, and in turn, the software partition is divided into a first partition, a second partition, and a gold partition. When powered on or reset, the system usually starts execution from address 0 where usually arranges the system's BOOTLOADER program, that is, the MCU 1 starts to run the program from the BOOTLOADER partition. The gold partition is a default partition of the optical amplifier, and is used only when the upgrade fails or when the first partition and the second partition are damaged. The first partition and the second partition alternately save the corresponding latest upgrade code. The program selection partition is updated according to the partition where the upgrade code is currently saved. When the upgrade fails, the program selection partition is not updated, and the code is rolled back to a program state before the upgrade to ensure that the optical amplifier continues to be used normally. The programs of the BOOTLOADER partition and of the gold partition could not be upgraded online, which ensures that the program can still be upgraded online under extreme conditions, improving the product reliability.

Specifically, when the MCU 1 receives the upgrade code, there are three areas in the FLASH that need to be written: the program selection partition, the first partition, and the second partition, and there is a risk of failure in writing for each of them. However, the BOOTLOADER partition and the gold partition could not be changed, that is, the two partitions are not written. The mechanism is roughly as follows: when finished, both the BOOTLOADER partition and the gold partition are valid content, so does the first partition, and the program select partition is written 1 (indicating that the first partition saves the code at this time); when upgrading once, the second partition is written into the effective content, and then the program selection partition is written 2 (indicating that the second partition saves the code at this time); upgrading again, the first partition is written valid content, and the program selection partition is written 1, and so on; when the program selection partition fails to write, for example, 100, then the gold partition works at this time, which can ensure the normal operation of the system and can be upgraded again.

Further referring to FIG. 4, in order to separately save the program upgrade code of the MCU 1 and the program upgrade code of the programmable logic device 2, the address space of the program memory 3, in addition to the BOOTLOADE partition, the program selection partition, and the software partition, further comprises a firmware partition which is also divided into a first partition, a second partition, and a gold partition. The software partition is used to write the MCU program upgrade code, and the firmware partition is used to write the FPGA program upgrade code. The function of each partition in the firmware partition is similar to that of the software partition, thus they can be understood by referring to the above introduction and will not be repeated here. Through reasonable division of the address space, the risk of failure of the optical amplifier program upgrade is reduced, and the normal operation of the optical amplifier is ensured.

In the embodiment of the present disclosure, the digital-to-analog converter 4 may have a serial interface or a parallel interface, and the programmable logic device 2 controls the analog voltage of the digital-to-analog converter 4 through a digital interface to ensure that light is not interrupted during upgrading. When the digital-to-analog converter 4 has a serial interface, it comprises a chip select, a clock interface, and one data line. When the digital-to-analog converter 4 has a parallel interface, it comprises a chip select, a clock interface, and multiple data lines. The programmable logic device 2 controls the analog voltage of the digital-to-analog converter 4 by controlling the corresponding chip select and clock interface: in the step 302, after the programmable logic device 2 receives the upgrade instruction, it sets a chip select signal and a clock level to invalid levels by controlling the chip select and clock interface, thereby stopping the operation of the digital-to-analog converter 4, so that the analog voltage of the digital-to-analog converter 4 is no longer updated and remains unchanged; in the step 304, when the programmable logic device 2 receives the last saved working state and parameters, the chip select signal and the clock level are set to the same level as before loading the upgrade code by controlling the chip select and the clock interface, completing the switching of the working state of the digital-to-analog converter 4, so that the output light of the optical amplifier is not broken/continuous and the state remains unchanged.

Figure 5:
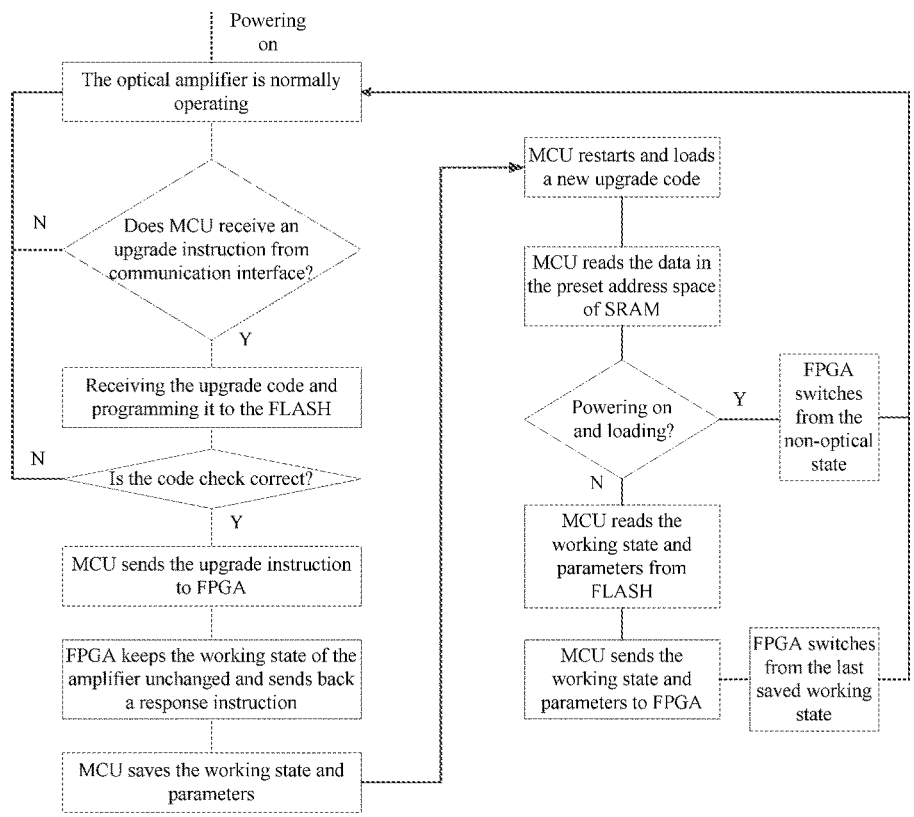
FIG. 5 is a specific schematic flowchart of an online upgrading program for an optical amplifier provided by an embodiment of the present disclosure.

In combination with the above introduction, the complete process for online upgrading the program of optical amplifier can refer to FIG. 5, and can be summarized as follows: firstly updating the program to FLASH, saving the current action status and parameters, and then loading the new program; if the loading mode is the continuous light loading, switching to the last working state, and then entering the normal working state on this basis, to achieve a smooth transition of optical communication service.

The upgrade method described in the embodiment of the present disclosure can be used for various optical amplifiers, such as Raman fiber amplifiers, erbium-doped fiber amplifiers, ytterbium-doped fiber amplifiers, hybrid fiber amplifiers, and high-power fiber amplifiers. In the upgrade method introduced above, the MCU program and the FPGA program are upgraded together. At the same time, the system also supports the independent upgrade of the MCU program and the FPGA program. In the application scenarios that need to be upgraded separately, the upgrade time can be saved to a certain extent, thereby reducing risk and improving efficiency.

Figure 6:
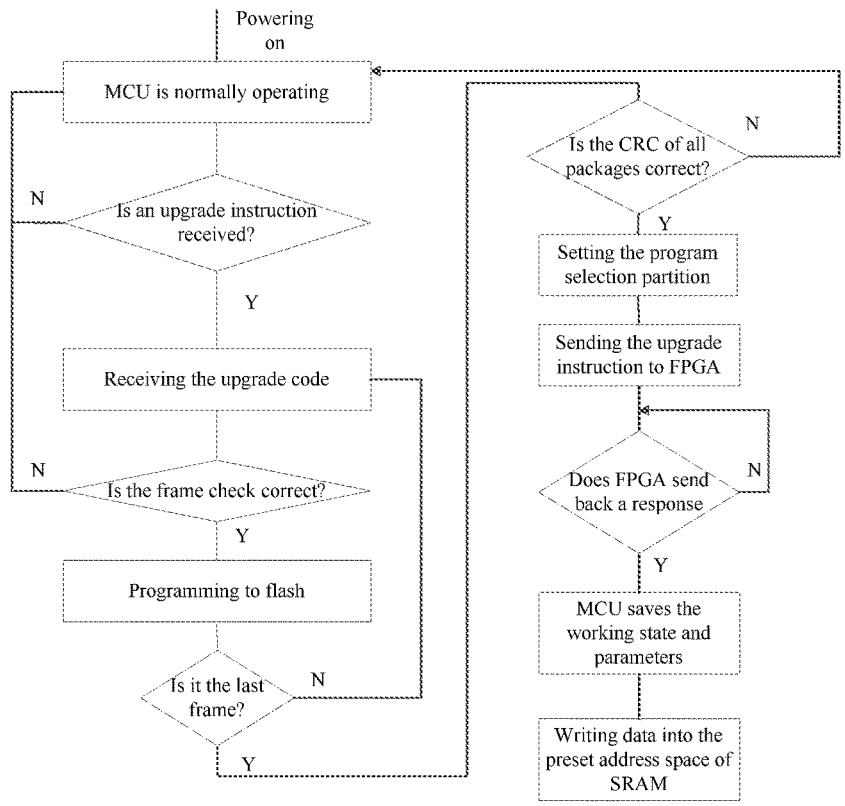
FIG. 6 is a schematic diagram showing a processing flow after the MCU receives an upgrade instruction according to an embodiment of the present disclosure.

Specifically, as to the MCU 1, the method for individually upgrading the MCU program can be summarized as the following two major steps:

In the first step, when receiving the upgrading instruction, the MCU receives the corresponding MCU program upgrade code, and checks each frame of the upgrade code separately, then programs the upgrade code to FLASH (the first partition or the second partition in the software partition) after each frame of the upgrade code is correct by check; then the CRC of the data packet is performed, and when the CRC of each packet is correct, the program selection partition in the FLASH is set according to the programming address of the upgrading code, and the upgrading instruction is sent to the FPGA; after the FPGA sends back a response, the MCU saves the current working state and parameters into FLASH, and writes data to the preset address space of the SRAM. Refer to FIG. 6 for the specific process.

Figure 7:
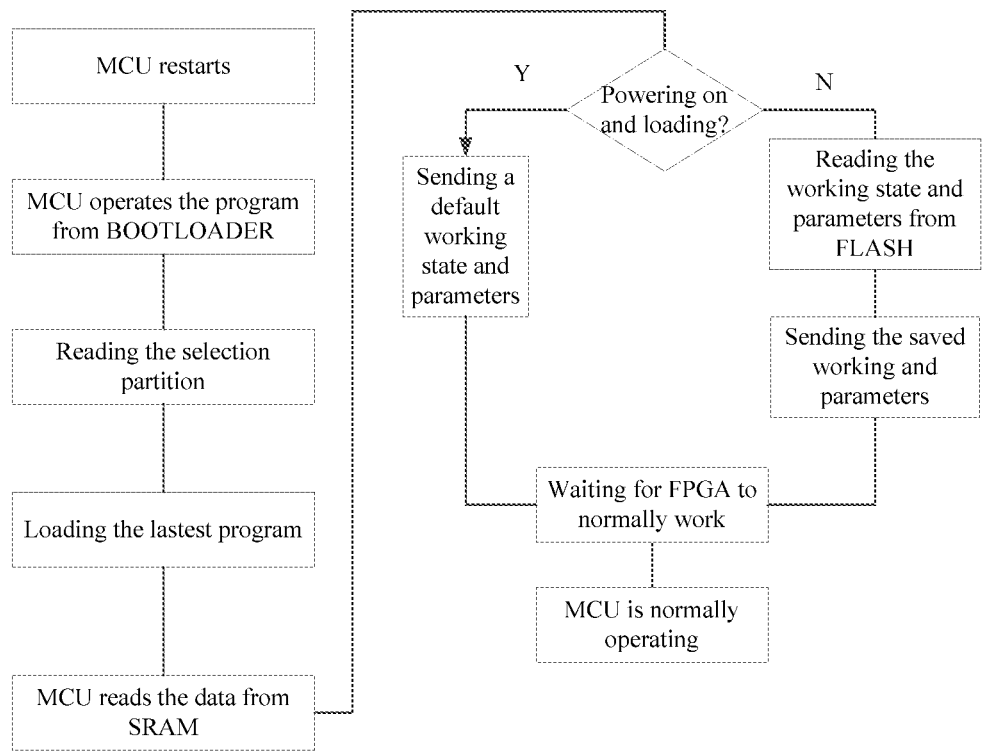
FIG. 7 is a schematic flowchart after the MCU has loaded a new program according to an embodiment of the present disclosure.

In the second step, the new program is loaded: the MCU restarts, and start to run the program from the BOOT-LOADE partition of FLASH, and then a section for currently saving the upgrade code is determined according to the program selection partition, and the latest program is loaded from the corresponding section, for example, if the program selection partition is currently marked 1, the latest program is loaded from the first partition; at the same time, the MCU reads the data in the preset address space of SRAM to determine the current loading mode, and then indicates the current loading mode to the FPGA; if the current loading mode is the power-on loading, the MCU sends the default working state and parameters to the FPGA, and if the loading mode is the continuously loaded, the MCU reads the last saved working state and parameters from the FLASH and sends them to the FPGA. Refer to FIG. 7 for the specific process.

Figure 8:
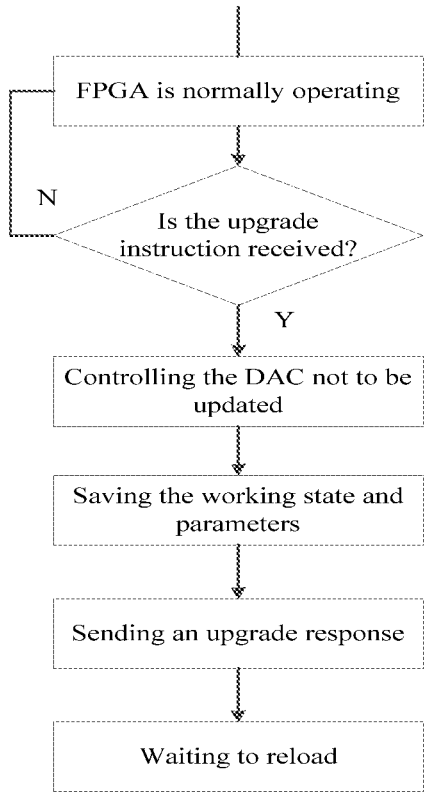
FIG. 8 is a schematic flowchart showing a processing flow after the FPGA receives an upgrade instruction according to an embodiment of the present disclosure.

Specifically, as to the programmable logic device 2, the method for separately upgrading the FPGA program can be summarized as the following two major steps:

In the first step, after receiving the upgrade instruction from the MCU during the normal operation, the FPGA stops the work of the DAC, and controls the analog signal voltage of the DAC to remain unchanged, thereby keeping the working state and parameters unchanged, and at the same time, the FPGA saves the current working state and parameters of the optical amplifier and transmits them to the MCU, and sends back a response signal, waiting to be reloaded. As for the specific process, refer to FIG. 8.

Figure 9:
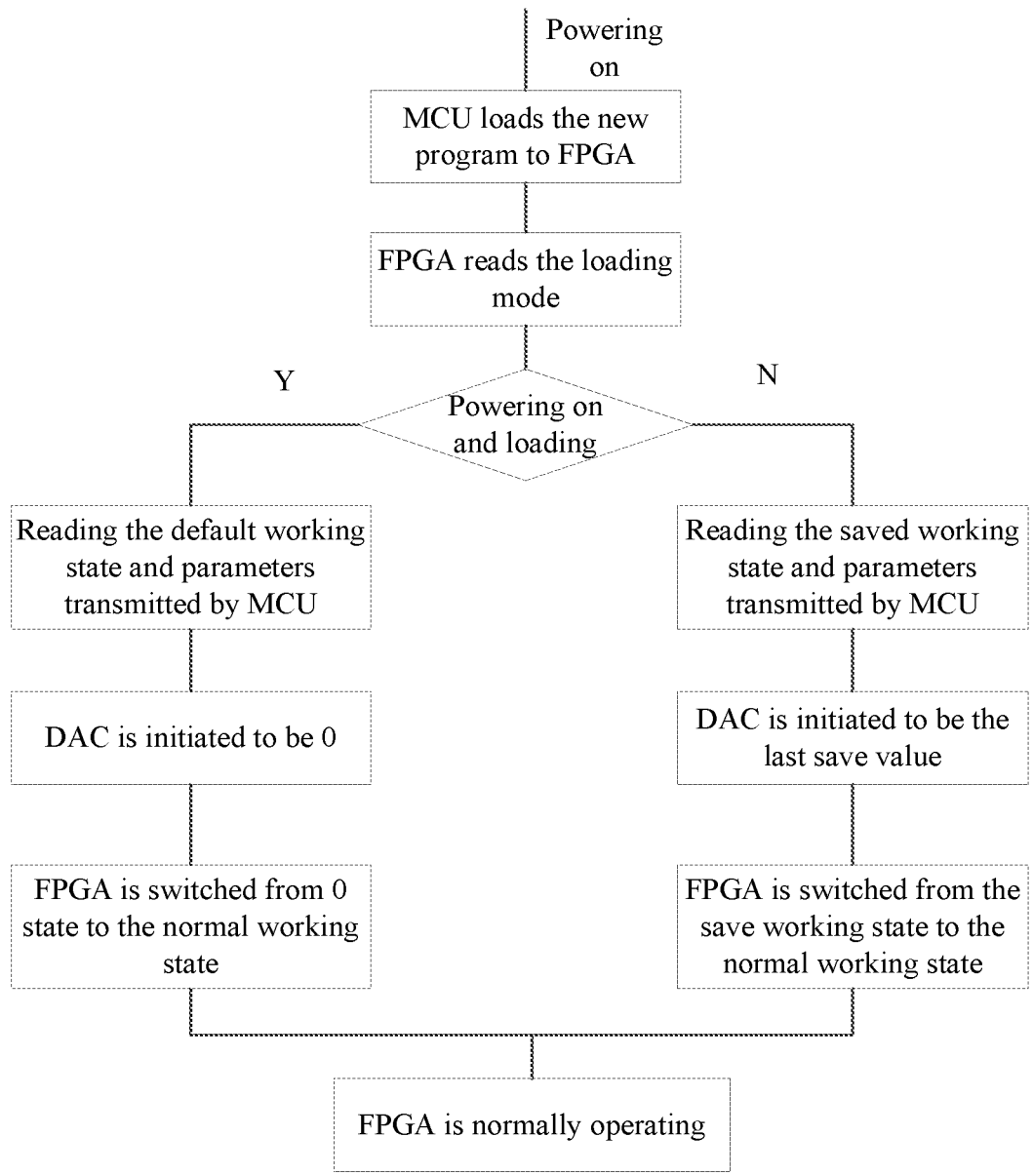
FIG. 9 is a schematic flowchart after the FPGA has loaded a new program according to an embodiment of the present disclosure.

In the second step, the new program is loaded: the MCU loads the FPGA program upgrade code from the corresponding FLASH partition and transmits it to the FPGA; FPGA reads the current loading mode from the MCU, and if the loading mode is the power-on loading, the FPGA receives the default working state and parameters transmitted by the MCU, sets the initial digital signal of the DAC to be 0, and is switched from the zero state to the normal working state; if the loading mode is the continuous optical loading, the FPGA receives the last saved working state and parameters transmitted by the MCU, sets the initial digital signal of the DAC as the last saved data, and is switched the FPGA from the last saved working state to the normal working state. As for the specific process, refer to FIG. 9.

It can be seen from the above introduction that, compared with the prior art, the present disclosure has the following beneficial effects: without adding or changing any hardware circuits of the optical amplifier, by optimizing the system design, using programmable logic devices and digital-to-analog conversion characteristics, the present disclosure carries out special control during the upgrading to achieve the optical fiber communication service not be interrupted during the program update and upgrade, significantly improving the economic benefit; the present disclosure fully utilizes the device characteristics of the existing static random access memory of the optical amplifier, combining a simply algorithm, to determine the power-on loading and continuous optical loading, thereby providing a basis for the determination of the online upgrade of the entire device; the present disclosure provides detailed arrangement of how to partition the address space of the program memory, reducing the risk of upgrade, improving the reliability of the optical amplifier, and extending the vitality of the product.

Embodiment 2

On the basis of the above-mentioned embodiment 1, the embodiment of the present disclosure further provides a device for an optical amplifier online upgrade program, which can be used to implement the method of the embodiment 1. Referring to FIG. 2, the device comprises a Microcontroller Unit (MCU) 1, a programmable logic device 2, a program memory 3, and a digital-to-analog converter 4. The MCU 1 is used to receive an upgrade instruction and an upgrade code, and the program memory 3 is used to store the upgrading code and a working state and parameters of an optical amplifier. The programmable logic device 2 is used to control the digital-to-analog converter 4 according to the upgrading instruction and the working state and parameters, and the digital-to-analog converter 4 is used to convert a control digital signal output by the programmable logic device 2 into an analog voltage.

The MCU 1 communicates with a computer or a network management system through a communication interface a, and communicates with the programmable logic device 2 through an on-board bus interface b, so that the MCU 1 can receive the upgrade instruction through the communication interface a and the upgrade code of the MCU program and of the FPGA program, and carry out information interaction with the programmable logic device 2 through the on-board bus interface b, at the same time programming the data and/or parameters to be saved into the program memory 3. The programmable logic device 2 is communicatively connected with the digital-to-analog converter 4, and the programmable logic device 2 receives the instructions and parameters from the MCU 1 through the on-board bus interface b, and then it can control the digital-to-analog converter 4 to ensure that the optical transmission service of the amplifier is continuously available based on the instructions and parameters transmitted from the MCU 1.

Based on the conventional optical amplifier control, the present disclosure combines the characteristics of the MCU and the programmable logic device itself, using the programmable logic device and digital-to-analog conversion characteristics without adding or changing the optical amplifier hardware circuit, and performs special control during the upgrade through optimizing the system design, to achieve the effect of not interrupting the optical fiber communication service during the program upgrade, and to complete the smooth transition of the business, thereby improving the stability and reliability of the entire optical communication system.

The optical amplifier can be any one of a Raman fiber amplifier, an erbium-doped fiber amplifier, a ytterbium-doped fiber amplifier, a hybrid fiber amplifier, and an high-power fiber amplifier, which is not exclusively limited.

Continuing to refer to FIG. 2, the device may further comprise a static random access memory 5. The static random access memory 5 is communicatively connected with the MCU 1 and is used to store the dynamically updated data of the MCU 1 when it is running, enabling the MCU 1 to determine the loading mode, wherein the loading mode is divided into power-on loading and continuous light loading. The MCU 1 writes data to the preset address space of the static random access memory 5 in advance, and subsequently reads the data in the preset address space of the static random access memory 5, and uses the characteristics of the SRAM itself and an algorithm to analyzes the regularity of the data and then determines the loading mode. Since the static random access memory 5 may lose all internal data after the power is turned off, the internal data may be random numbers after the power is turned on again. When the MCU 1 reads the data in the preset address space for the first time, the data is randomly distributed; then the MCU 1 writes regular data, and when the MCU 1 reloads and runs, the read data is regular data. Therefore, if the data read by the MCU 1 is a random number, it is determined that the current loading mode is the power-on loading; if the read data has regularity, it is determined that the current loading mode is the continuous light loading. The present disclosure makes full use of the device characteristics of the existing static random access memory of the optical amplifier, and combines a simple algorithm to determine the power-on loading and the continuous light loading, providing a determination basis for the online upgrade of the entire device.

Continuing to refer to FIG. 2, the device further comprises a pump laser control system 6 and/or a tunable optical attenuator control system 7. The pump laser control system 6 is connected to the digital-to-analog converter 4 for adjusting the current of a pump laser according to an analog voltage output by the digital-to-analog converter 4, thereby adjusting the output light. The tunable optical attenuator control system 7 is connected to the digital-to-analog converter 4 for adjusting the attenuation value of a tunable optical attenuator according to the analog voltage output by the digital-to-analog converter 4. The device further comprises a passive optical system 8, which is connected to the pump laser control system 6, and is used to couple input light and pump light of the pump laser to a gain medium to achieve the amplification of the input light. The passive optical system 8 can also be built-in optical devices, such as isolators and filters, to achieve various indicators of optical performance.

For the optical system, the core is the control for the pump laser and the tunable optical attenuator. Take the erbium-doped fiber amplifier as an example. The input light and the pump light can be coupled to the erbium-doped fiber through a coupler. The erbium ions in the erbium fiber are excited by the pump light. When the signal light is input, the signal photon produces a stimulated emission effect by interaction of the erbium-doped fiber. The metastable Er3+ ions transition to the ground state in the form of stimulated emission, and generate photons exactly as the same as the photons in the incident signal light, thereby realizing the effect of amplifying the input signal light. By adjusting the magnitude of the output voltage of the digital-to-analog converter 4, the magnitude of the pump light can be adjusted, and then the output light can be adjusted. On the other hand, by adjusting the output voltage of the digital-to-analog converter 4, the attenuation value of the tunable optical attenuator can also be adjusted. The pump laser control system 6 and the tunable optical attenuator control system 7 determines the output magnitude and magnification of the system light together.

In the embodiment of the present disclosure, the digital-to-analog converter 4 may have a serial interface or a parallel interface, and the programmable logic device 2 controls the magnitude of the analog voltage of the digital-to-analog converter 4 through a digital interface to ensure that the light is continuous during the upgrade process. When the digital-to-analog converter 4 has a serial interface, it comprises a chip select, a clock interface, and one data line. When the digital-to-analog converter 4 has a parallel interface, it comprises a chip select, a clock interface, and multiple data lines. The programmable logic device 2 sets a chip selection signal and a clock level by controlling the corresponding chip select and the corresponding clock interface, and thus controls the magnitude of the analog voltage of the digital-to-analog converter 4, so that the analog voltage of the digital-to-analog converter 4 is no longer updated and remains unchanged, and the optical amplifier outputs unbroken light and remains its state unchanged.

In combination with the embodiment of the present disclosure, there is also a preferred implementation solution, which reduces the risk of upgrade failure by reasonably dividing the address space of the program memory 3. As shown in FIG. 4, the address space of the program memory 3 is firstly divided into a BOOTLOADE partition, a program selection partition, and a software partition, and the software partition is in turn divided into a first partition, a second partition, and a gold partition. The MCU 1 starts to run the program from the BOOTLOADER partition, and the gold partition is the default partition of the optical amplifier, which is used only when the upgrade fails or when the first partition and the second partition are damaged. The first partition and the second partition alternately save the corresponding latest upgrade code. The program selection partition is updated according to the partition where the upgrade code is currently saved. When the upgrade fails, the program selection partition is not updated, and the code rolls back to the program state before the upgrade, in order to ensure that the optical amplifier continues to be used normally. The programs of the BOOTLOADER partition and of the gold partition could not be online upgraded, which ensures that the programs can still be upgraded online under extreme conditions, improving the reliability of the product. In order to separately save the MCU program upgrade code and the FPGA program upgrade code, the address space of the program memory 3 further comprises a firmware partition. The firmware partition is also divided into a first partition, a second partition, and a gold partition. The software partition is used for writing the MCU program upgrade code, and the firmware partition is used to write the FPGA program upgrade code. The function of each partition in the firmware partition is similar with that of the software partition. Through reasonable division of the address space, the risk of failure of the optical amplifier program upgrade is reduced, and the normal operation of the optical amplifier is ensured.

For the specific application of each structure, reference may be made to the related introduction in the first embodiment, which will not be repeated here. Compared with the prior art, the present disclosure has the following benefits: without adding or changing any hardware circuits of the optical amplifier, by optimizing the system design and utilizing the programmable logic device and digital-to-analog conversion characteristics, and performing special control during upgrades, non-interruption of optical fiber communication services is achieved during the program update and upgrade, and economic benefits are significantly improved; determination of the power-on loading and continuous optical loading could be performed, thereby providing a basis for the determination of the online upgrade of the entire device by making full use of the device characteristics of the existing static random access memory of the optical amplifier, combined with a simple algorithm; the division of the program memory address space is meticulously arranges, thereby reducing the upgrade risk, improving the reliability of the optical amplifier, and extending the vitality of the product.

The above are only the preferred embodiments of the present disclosure and are not intended to limit the present disclosure. Any modification, equivalent replacement and improvement made within the spirit and principle of the present disclosure shall be included in the protection of the present disclosure.

What is claimed is:

1. An online upgrade program method for an optical amplifier, the online upgrade program method comprising:
saving an upgrade code and sending an upgrade instruction to a programmable logic device in response to a microcontroller unit (MCU) receiving the upgrade instruction and the upgrade code;
stopping operation of a digital-to-analog converter after the programmable logic device receives the upgrade instruction and sending a response back to the MCU by the programmable logic device to enable the MCU to save a current working state and parameters;
after the MCU restarts, loading a last saved upgrade code and sending a last saved working state and parameters to the programmable logic device by the MCU;
according to the received working state and parameters, switching, by the programmable logic device, the working state of the digital-to-analog converter to enable an initial state of the current operation to be the same as the working state before the upgrade code is loaded, wherein after the MCU restarts and loads the last saved upgrade code, the method further comprises:
determining whether a current loading mode is power-on loading or continuous light loading:
in a case where the current loading mode is the power-on loading, sending a default working state and parameters to the programmable logic device by the MCU, so that the programmable logic device controls the digital-to-analog converter to switch from a non-light state to the default working state: and
in a case where the current loading mode is the continuous light loading, sending the last saved working state and parameters to the programmable logic device by the MCU, so that the programmable logic device controls the digital-to-analog converter to switch to the last saved working state.

2. The online upgrade program method for an optical amplifier of claim 1, wherein the MCU determines the loading mode through a static random access memory, specifically:
the static random access memory stores data dynamically updated in response to the MCU running, and after loading the last saved upgrade code, the MCU reads the data in a preset address space of the static random access memory, and analyzes regularity of the data; and
in a case where the data read from the preset address space is a random number, the current loading is determined to be the power-on loading; and in a case where the data read from the preset address space has a preset regularity, the current loading is determined to be the continuous light loading.

3. The online upgrade program method for an optical amplifier of claim 1, wherein the upgrade code received by the MCU is divided into multiple frames, each frame of which contains a check bit, and programs of the MCU and of the programmable logic device respectively contain a CRC check of a total package, and wherein the MCU checks the upgrade code after receiving the same, and sends the upgrade instruction to the programmable logic device when the check of each frame of the upgrade code is correct and the check of each package of the CRC is correct.

4. The online upgrade program method for an optical amplifier of claim 1, wherein the upgrade code is saved in a program memory, and an address space of the program memory comprises a BOOTLOADER partition, a program selection partition, a first partition, a second partition, and a gold partition;
wherein the MCU starts to run a program from the BOOTLOADER partition, the first partition and the second partition alternately save the latest upgrade code, the program selection partition is updated according to a partition where the upgrade code is currently saved, and the gold partition is a default partition of the optical amplifier and is used when an upgrade fails.

5. The online upgrade program method for an optical amplifier of claim 1, wherein the digital-to-analog converter has a serial interface, comprising a chip select, a clock interface, and one data line; or the digital-to-analog converter has a parallel interface, comprising a chip select, a clock interface and multiple data lines; wherein an analog voltage of the digital-to-analog converter is controlled by controlling the corresponding chip select and the corresponding clock interface, thereby controlling the digital-to-analog converter.

6. An online upgrade program device for an optical amplifier, wherein the online upgrade program device for an optical amplifier comprises a microcontroller unit MCU, a programmable logic device, a program memory, and a digital-to-analog converter;
the MCU being respectively communicatively connected with the programmable logic device and the program memory, and the programmable logic device being communicatively connected with the digital-to-analog converter;
wherein the MCU is used to receive an upgrade instruction and an upgrade code, and interacts with the program memory, the program memory used to store the upgrade code and a working state and parameters of the optical amplifier, the programmable logic device being used to control the digital-to-analog converter according to the upgrade instruction and the working state and parameters, and wherein the digital-to-analog converter is used to convert a control digital signal output by the programmable logic device into an analog voltage, and wherein after the MCU restarts and loads a last saved upgrade code, the MCU is configured to:
- determine whether a current loading mode is power-on loading or continuous light loading:
  - in a case where the current loading mode is the power-on loading, send a default working state and parameters to the programmable logic device by the MCU, so that the programmable logic device controls the digital-to-analog converter to switch from a non-light state to the default working state; and
  - in a case where the current loading mode is the continuous light loading, send a last saved working state and parameters to the programmable logic device by the MCU, so that the programmable logic device controls the digital-to-analog converter to switch to the last saved working state.

7. The online upgrade program device for an optical amplifier of claim 6, further comprising a static random access memory, which is communicatively connected with the MCU for saving data dynamically updated when the MCU is running, enabling the MCU to determine the current loading mode, wherein the current loading mode is divided into the power-on loading and the continuous light loading.

8. The online upgrade program device for an optical amplifier of claim 6, further comprising a pump laser control system and/or a tunable optical attenuator control system, the pump laser control system being connected to the digital-to-analog converter and being used to adjust a current of a pump laser according to the analog voltage output by the digital-to-analog converter, thereby adjusting magnitude of output light;
- the tunable optical attenuator control system being connected to the digital-to-analog converter, and being used to adjust an attenuation value of a tunable optical attenuator according to the analog voltage output by the digital-to-analog converter.

9. The online upgrade program device for an optical amplifier of claim 8, further comprising a passive optical system, which is connected with the pump laser control system for coupling input light and pump light from the pump laser to a gain medium to realize amplification of the input light.

* * * * *